(12) United States Patent
Kwak et al.

(10) Patent No.: US 11,585,554 B2
(45) Date of Patent: Feb. 21, 2023

(54) USER INTERFACE FOR OPERATING AIR CONDITIONER OF VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventors: Jungmo Kwak, Gunpo-si (KR); Myung Jun Kim, Busan (KR); Dong Won Yeon, Daejeon (KR); UiJin Jeong, Pohang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 207 days.

(21) Appl. No.: 17/113,152

(22) Filed: Dec. 7, 2020

(65) Prior Publication Data
US 2021/0389009 A1 Dec. 16, 2021

(30) Foreign Application Priority Data
Jun. 10, 2020 (KR) ........................ 10-2020-0070128

(51) Int. Cl.
*F24F 11/52* (2018.01)
*G09G 5/36* (2006.01)
*B60K 35/00* (2006.01)
*B60H 1/00* (2006.01)

(52) U.S. Cl.
CPC .......... *F24F 11/52* (2018.01); *B60H 1/00985* (2013.01); *B60K 35/00* (2013.01); *G09G 5/36* (2013.01); *B60K 2370/12* (2019.05); *B60K 2370/152* (2019.05); *B60K 2370/16* (2019.05); *G09G 2354/00* (2013.01); *G09G 2380/10* (2013.01)

(58) Field of Classification Search
CPC .............. B60H 1/0065; B60H 1/00985; B60H 2001/002; B60K 35/00; B60K 37/06; B60K 2370/12; B60K 2370/1438; B60K 2370/152; B60K 2370/16; B60K 2370/195; B60K 2370/52; B60W 50/14; B60W 2050/146; F24F 11/52; G06F 3/0488; G09G 5/36; G09G 2354/00; G09G 2380/10; G09G 3/20
See application file for complete search history.

(56) References Cited

U.S. PATENT DOCUMENTS

| | | | | |
|---|---|---|---|---|
| 2012/0330507 | A1* | 12/2012 | Auner ................ | B60H 1/00985 701/36 |
| 2016/0176264 | A1* | 6/2016 | Jablonski .......... | B60H 1/00985 165/203 |
| 2021/0070145 | A1* | 3/2021 | Nitze-Nelson ..... | B60H 1/00985 |

\* cited by examiner

*Primary Examiner* — Nelson M Rosario
(74) *Attorney, Agent, or Firm* — Morgan, Lewis & Bockius LLP

(57) ABSTRACT

A user interface for operating the air conditioner of a vehicle is disclosed. The user interface includes a display apparatus configured to receive a user input for the air conditioner, and a controller configured to output activation indication and deactivation indication in multiple areas of the vehicle in response to the user input and a time point, and control the display apparatus to change the activation indication and deactivation indication.

14 Claims, 17 Drawing Sheets

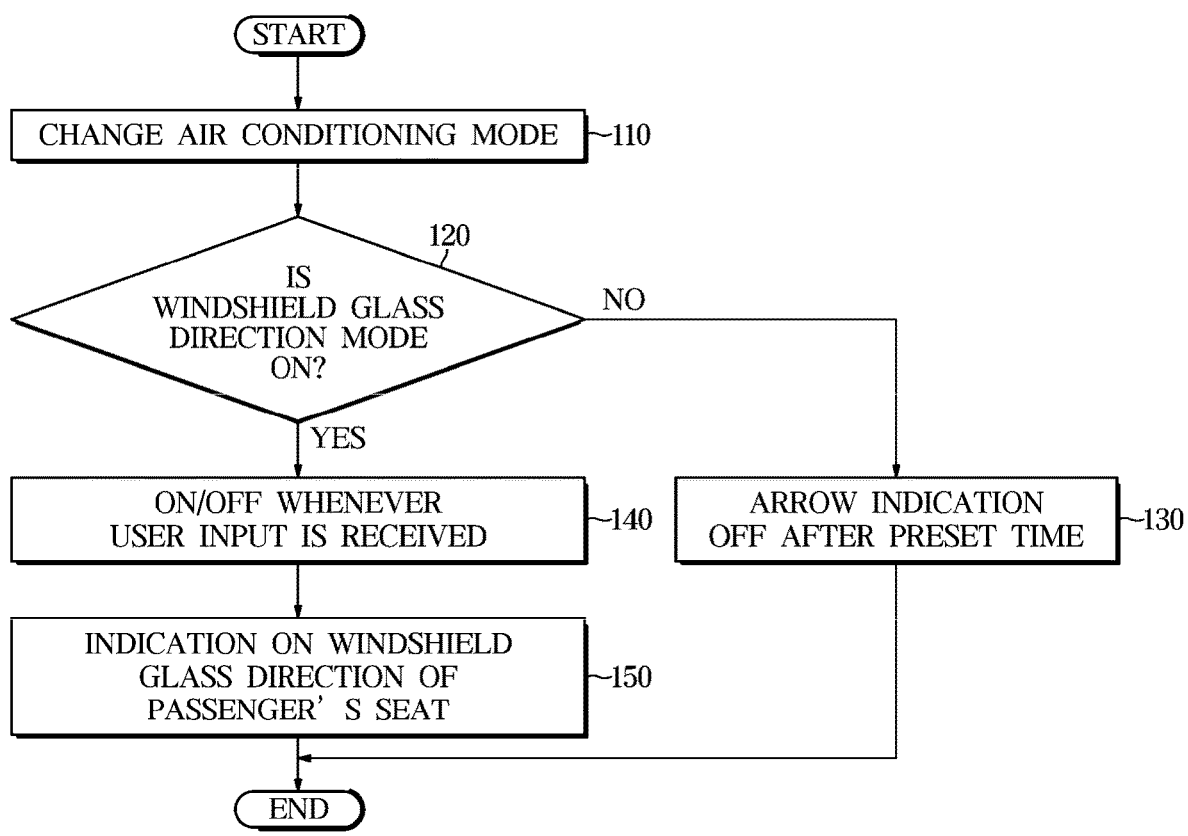

USER INTERFACE FOR OPERATING AIR CONDITIONER OF VEHICLE AND METHOD OF CONTROLLING THE SAME

CROSS-REFERENCE TO RELATED APPLICATION(S)

This application is based on and claims priority to Korean Patent Application No. 10-2020-0070128, filed on Jun. 10, 2020 in the Korean Intellectual Property Office, the disclosure of which is incorporated by reference in its entirety.

TECHNICAL FIELD

The present disclosure relates to a vehicle and a method of controlling the vehicle, and more particularly, to a user interface for operating an air conditioner in the vehicle.

BACKGROUND

A vehicle is equipped with an air conditioner to keep the air environment comfortable according to various changes in the surroundings. The air conditioner may include a cooling device that maintains a low temperature and a heating device that maintains a high temperature.

In the air conditioner where a synchronization (SYNC) control of a driver's seat and a passenger's seat is performed, a wind is coming in a direction of the passenger's seat, but there is a problem that a user interface does not indicate that the wind is coming out, so that a user may misunderstand that the wind is not being discharged.

In addition, even if the user interface indicates whether or not blowing air is operated in the direction of the passenger's seat, there is a disadvantage that the user may be mistaken for a malfunction because the user interface cannot receive a user input.

The information included in this Background section is only for enhancement of understanding of the general background of the present disclosure and may not be taken as an acknowledgement or any form of suggestion that this information forms the prior art already known to a person skilled in the art.

SUMMARY

An aspect of the present disclosure is to provide a vehicle that provides a user interface that allows a user to intuitively control an air conditioner, and a method of controlling the vehicle.

Additional aspects of the present disclosure will be set forth in part in the description which follows and, in part, will be obvious from the description, or may be learned by practice of the present disclosure.

In accordance with an aspect of the present disclosure, a vehicle may include: an air conditioner; a display apparatus configured to receive a user input for blowing discharge of the air conditioner capable of synchronization (SYNC) control, and including a first area and a second area each of which configured to output at least one of an activation indication or a deactivation indication for blowing discharge of the air conditioner; and a controller configured to output at least one of the activation indication or the deactivation indication for blowing discharge of the air conditioner in the first area, in response to the user input for blowing discharge of the air conditioner capable of SYNC control being received, to output the activation indication for blowing discharge of the air conditioner in the second area, in response to a time point at which at least one of the activation indication or the deactivation indication for blowing discharge of the air conditioner is output in the first area, and to control the display apparatus to change and output the activation indication to the deactivation indication in the second area, in response to the arrival of a preset time.

The first area may include a plurality of push buttons, and the plurality of push buttons are configured to correspond to a blowing position of the air conditioner, respectively. The second area may include a plurality of push buttons, and the plurality of push buttons are configured to correspond to the blowing position of the air conditioner, respectively.

The first area may include a first push button, a second push button, and a third push button. The second area may include a fourth push button, a fifth push button, and a sixth push button.

A blowing direction according to the blowing position of the air conditioner corresponding to the first push button of the first area and the fourth push button of the second area may be a direction of a windshield glass of the vehicle.

The blowing discharge according to the blowing position of the air conditioner corresponding to the first push button of the first area and the fourth push button of the second area may be configured to enable mutual SYNC control.

The controller may be configured to output the activation indication to the first push button of the first area and the fourth push button of the second area, in response to receiving the user input for discharging blowing air in the direction of the windshield glass of the vehicle while the first push button of the first area outputs the deactivation indication; and to control the display apparatus so that the first push button of the first area maintains the activation indication, and the fourth push button of the second area changes the activation indication to the deactivation indication and outputs the deactivation indication, in response to the arrival of the preset time.

The controller may be configured to output the deactivation indication to the first push button of the first area and output the activation indication to the fourth push button of the second area, in response to receiving the user input for stopping blowing air in the direction of the windshield glass of the vehicle while the first push button of the first area outputs the activation indication; and to control the display apparatus so that the fourth push button of the second area changes the activation indication to the deactivation indication and outputs the deactivation indication, in response to the arrival of the preset time.

In response to receiving the user input from the first push button of the first area while the first push button of the first area outputs the deactivation indication, the controller may be configured to control the air conditioner so that the air conditioner discharges blowing air in the blowing position of the vehicle corresponding to positions of the first push button of the first area and the fourth push button of the second area.

The controller may be configured to output the activation indication to the first push button of the first area, the third push button of the first area, and the fourth push button of the second area, in response to receiving the user input for discharging blowing air in the direction of the windshield glass of the vehicle and in a direction below a driver's seat while the first push button of the first area outputs the deactivation indication; and to control the display apparatus so that the first push button of the first area and the third push button of the first area maintain the activation indication, and the fourth push button of the second area changes the activation indication to the deactivation indication and output the deactivation indication, in response to the arrival of the preset time.

In response to receiving the user input for blowing discharge of the air conditioner in at least one of a direction of a driver's seat, a direction below the driver's seat, a direction of a passenger's seat, and a direction below the passenger's seat of the vehicle, the controller may be configured to control the display apparatus to output at least one of the activation indication and the deactivation indication to at least one of the second push button of the first area, the third push button of the first area, the fifth push button of the second area, and the sixth push button of the second area corresponding to the blowing position.

In accordance with another aspect of the present disclosure, a method of controlling a vehicle may include, in response to a user input for blowing discharge of an air conditioner capable of synchronization (SYNC) control being received, outputting, by a controller, at least one of an activation indication and a deactivation indication for blowing discharge of the air conditioner in a first area of a display apparatus; in response to a time point at which at least one of the activation indication and the deactivation indication for blowing discharge of the air conditioner is output in the first area, outputting, by the controller, the activation indication for blowing discharge of the air conditioner in a second area of the display apparatus; and changing and outputting, by the controller, the activation indication to the deactivation indication in the second area in response to the arrival of a preset time.

The first area may include a plurality of push buttons, and the plurality of push buttons are configured to correspond to a blowing position of the air conditioner, respectively. The second area may include a plurality of push buttons, and the plurality of push buttons are configured to correspond to the blowing position of the air conditioner, respectively.

The first area may include a first push button, a second push button, and a third push button. The second area may include a fourth push button, a fifth push button, and a sixth push button.

A blowing direction according to the blowing position of the air conditioner corresponding to the first push button of the first area and the fourth push button of the second area may be a direction of a windshield glass of the vehicle.

The blowing discharge according to the blowing position of the air conditioner corresponding to the first push button of the first area and the fourth push button of the second area may be configured to enable mutual SYNC control.

The method may further include, in response to receiving the user input for discharging blowing air in the direction of the windshield glass of the vehicle while the first push button of the first area outputs the deactivation indication, outputting, by the controller, the activation indication to the first push button of the first area and the fourth push button of the second area; and in response to the arrival of the preset time, controlling, by the controller, the display apparatus so that the first push button of the first area maintains the activation indication, and the fourth push button of the second area changes the activation indication to the deactivation indication and outputs the deactivation indication.

The method may further include, in response to receiving the user input for stopping blowing air in the direction of the windshield glass of the vehicle while the first push button of the first area outputs the activation indication, outputting, by the controller, the deactivation indication to the first push button of the first area and output the activation indication to the fourth push button of the second area; and in response to the arrival of the preset time, controlling, by the controller, the display apparatus so that the fourth push button of the second area changes the activation indication to the deactivation indication and outputs the deactivation indication.

The method may further include, in response to receiving the user input from the first push button of the first area while the first push button of the first area outputs the deactivation indication, controlling, by the controller, the air conditioner so that the air conditioner discharges blowing air in the blowing position of the vehicle corresponding to positions of the first push button of the first area and the fourth push button of the second area.

The method may further include, in response to receiving the user input for discharging blowing air in the direction of the windshield glass of the vehicle and in a direction below a driver's seat while the first push button of the first area outputs the deactivation indication, outputting, by the controller, the activation indication to the first push button of the first area, the third push button of the first area, and the fourth push button of the second area; and in response to the arrival of the preset time, controlling, by the controller, the display apparatus so that the first push button of the first area and the third push button of the first area maintain the activation indication, and the fourth push button of the second area changes the activation indication to the deactivation indication and output the deactivation indication.

The method may further include, in response to receiving the user input for blowing discharge of the air conditioner in at least one of a direction of a driver's seat, a direction below the driver's seat, a direction of a passenger's seat, and a direction below the passenger's seat of the vehicle, controlling, by the controller, the display apparatus to output at least one of the activation indication and the deactivation indication to at least one of the second push button of the first area, the third push button of the first area, the fifth push button of the second area, and the sixth push button of the second area corresponding to the blowing position.

BRIEF DESCRIPTION OF THE DRAWINGS

These and/or other aspects of the present disclosure will become apparent and more readily appreciated from the following description of the embodiments, taken in conjunction with the accompanying drawings of which:

FIG. 8 is a flowchart illustrating a method of controlling a vehicle according to an embodiment.

DETAILED DESCRIPTION

Figure 1:
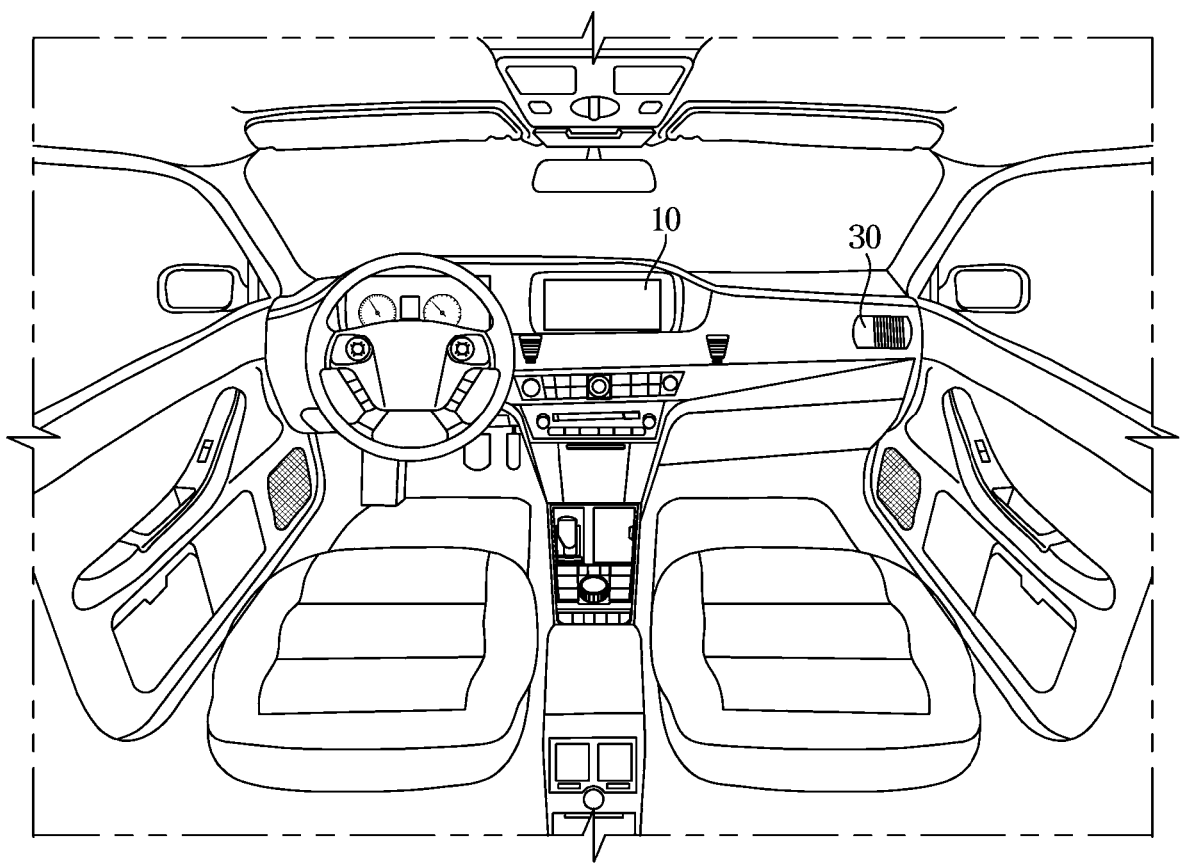
FIG. 1 is a view illustrating a vehicle according to an embodiment of the present disclosure.

Like reference numerals refer to like elements throughout the specification. Not all elements of the embodiments of the present disclosure will be described, and the description of what are commonly known in the art or what overlap each other in the exemplary embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned. It will be further understood that the term "member" and its derivatives refer both to when a member is in contact with another member and when another member exists between the two members.

Further, when it is stated that a layer is "on" another layer or substrate, the layer may be directly on another layer or substrate or a third layer may be disposed therebetween.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, an operation principle and embodiments of the present disclosure will be described with reference to accompanying drawings.

A vehicle disclosed in the present disclosure may be a hybrid vehicle, but is not limited thereto.

Hereinafter, embodiments of a vehicle and a method of controlling the vehicle according to aspects of the present disclosure are described in detail with reference to the accompanying drawings.

Figure 2:
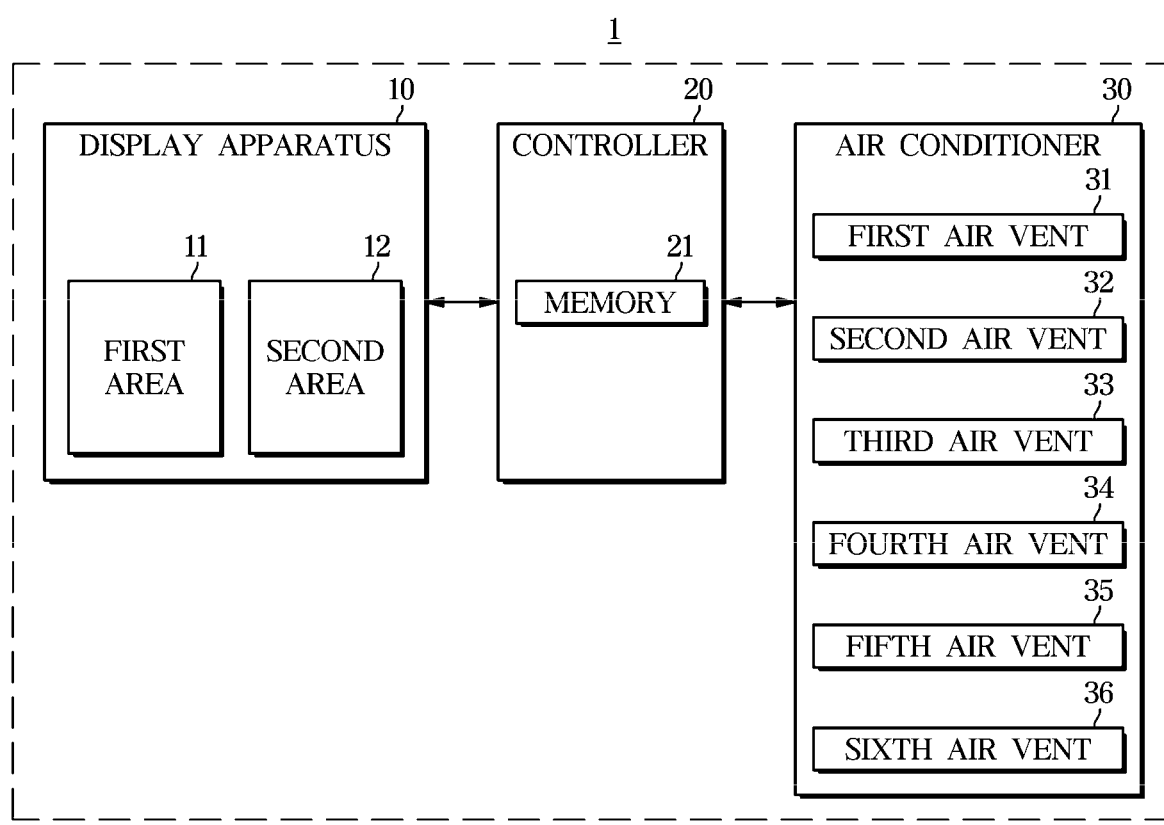
FIG. 2 is a control block diagram of a vehicle according to an embodiment of the present disclosure.
Figure 3:
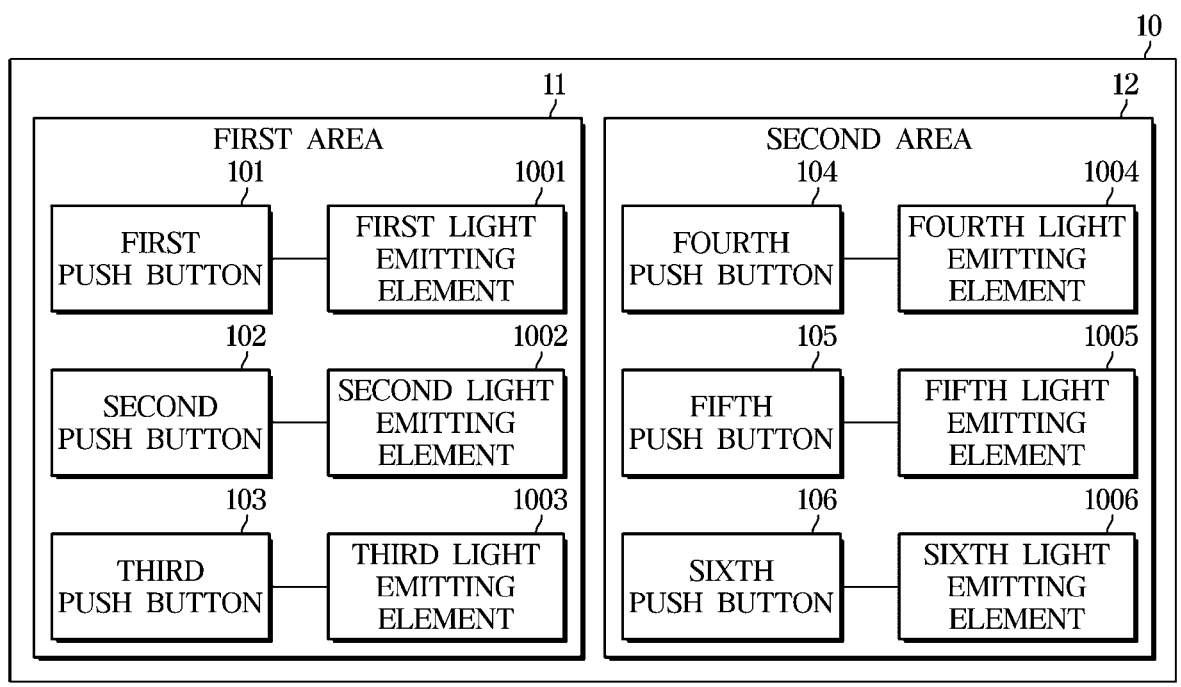
FIG. 3 is a view illustrating a configuration according to an embodiment of a display apparatus referred to in FIG. 2.

FIG. 1 is a view illustrating a vehicle according to an embodiment of the present disclosure. FIG. 2 is a control block diagram of a vehicle according to an embodiment of the present disclosure, FIG. 3 is a view illustrating a configuration according to an embodiment of a display apparatus and an air conditioner referred to in FIG. 2, and FIG. 4 is a view illustrating a configuration according to another embodiment of a display apparatus and an air conditioner referred to in FIG. 2.

Referring to FIGS. 1 and 2, a vehicle 1 may include a display apparatus 10 for receiving a user input regarding an operation and control of an air conditioner 30 and displaying a blowing state of the air conditioner 30, the air conditioner 30 for discharging blowing air based on the user input, and a controller 20 for controlling the display apparatus 10 and the air conditioner 30.

The display apparatus 10 may include a first area and a second area so as to receive the user input regarding a blowing position of the air conditioner 30 from the user.

The display apparatus 10 may output an activation indication or a deactivation indication indicating whether the air conditioner 30 is blowing air in response to the user input in the first area and the second area.

Here, when the user input is a control signal for discharging the air blown from the air conditioner 30, the display apparatus 10 may output the activation indication to the first area of the display apparatus 10 to mean that the air conditioner 30 is blown out to the first area and the second area.

When the user input is a control signal for stopping blowing of the air conditioner 30, the display apparatus 10 may output the activation indication to the first area of the display apparatus 10 to mean that the air conditioner 30 is not blown out to the first area and the second area.

The display apparatus 10 may be provided in the vehicle 1 by various methods. As described above, the display apparatus 10 may provide an input area by a plurality of push buttons. As shown in FIG. 3, the display apparatus 10 may be configured as a touch display and may output and provide the input area on a screen. The touch display may correspond to an input means for displaying various types of information related to the vehicle 1 on the screen so that the user provides various types of information and controls various devices of the vehicle 1 through various input gestures.

Particularly, the touch display may be implemented with a liquid crystal display (LCD), a light emitting diode (LED), a plasma display panel (PDP), an organic light emitting diode (OLED), a cathode ray tube (CRT), or the like. The touch display may include a display panel that displays an image and a touch screen panel that receives a user's gesture input.

The display apparatus 10 may be disposed in various positions within the vehicle 1. For example, the display apparatus 10 may be installed in at least one or more of a central panel area of a dashboard that is accessible to the user.

The air conditioner 30 may discharge the blowing air based on the user input.

When the air conditioner 30 receives the user input for the blowing of the air from the air conditioner 30, the air conditioner 30 may discharge the blowing air from an air vent corresponding to the blowing position according to the user input among a plurality of air vents.

In more detail, the air conditioner 30 may provide cooling or heating at various blowing positions through the plurality of air vents installed inside the vehicle 1. To this end, the air conditioner 30 may include a first air vent 31, a second air vent 32, and a third air vent 33 located around the driver's seat. For example, the first air vent 31 may be provided between a front window glass and the dashboard inside the vehicle 1 to discharge cooling and heating air to an upper part of the vehicle interior. The second air vent 32 may be provided at a height adjacent to the central panel area of the dashboard to discharge cooling and heating air to a middle of the vehicle interior. The third air vent 33 may be provided at the bottom of the driver's seat or at the bottom of the passenger's seat to discharge cooling and heating air to the lower part of the vehicle interior.

Here, as described above, the air conditioner 30 may be configured with two air vents in two or more rows of seats other than one row of the vehicle 1 as described above.

In addition, the air conditioner 30 may include a fourth air vent 34, a fifth air vent 35, and a sixth air vent 36 located around the passenger's seat. For example, the fourth air vent 34 may be provided between a front window glass and the dashboard inside the vehicle 1 to discharge cooling and heating air to an upper part of the vehicle interior. The fifth air vent 35 may be provided at a height adjacent to the central panel area of the dashboard to discharge cooling and heating air to a middle of the vehicle interior. The sixth air vent 36 may be provided at the bottom of the driver's seat or at the bottom of the passenger's seat to discharge cooling and heating air to the lower part of the vehicle interior.

The air conditioner 30 may be a device for providing cooling or heating of the vehicle 1. Particularly, the air conditioner 30 may include an air conditioning device that cools an indoor air of the vehicle 1 to provide a cooling state, and a heater that keeps the indoor air of the vehicle 1 warm.

The controller 20 may control an output of the display apparatus 10 and an operation of the air conditioner 30 in response to an input to the display apparatus 10.

In more detail, based on the received user input, the controller 20 may control the display apparatus 10 to output an indication of whether the air conditioner 30 blows air in the first area 11 and the second area 12.

In addition, the controller 20 may control the air conditioner 30 to change the position of the blown air discharged from the air conditioner 10.

Particularly, referring to FIG. 3, the controller 20 may output the activation indication and the deactivation indication by controlling on/off of a plurality of light emitting elements provided in the plurality of push buttons, and control the image representing the state of the air conditioner 10 on the screen of the display apparatus 10 to be changed. The plurality of light emitting elements may output the activation indication and the deactivation indication by the plurality of push buttons according to the user input.

The controller 20 may be implemented with a memory 21 storing programs to control operation of the display apparatus 10 and the air conditioner 30 or data about programs, and a processor carrying out the aforementioned operation to control the operation of the display apparatus 10 and the air conditioner 30 according to programs and data stored in the memory 21.

The memory 21 and the processor may be implemented in separate chips. Alternatively, the memory 21 and the processor may be implemented in a single chip.

As illustrated in FIG. 3, the display apparatus 10 may include a first push button 101, a second push button 102, and a third push button 103 in the first area 11. The first push button 101 may be provided with a first light emitting element 1001, the second push button 102 may be provided with a second light emitting element 1002, and the third push button 103 may be provided with a third light emitting element 1003.

The display apparatus 10 may include a fourth push button 104, a fifth push button 105, and a sixth push button 106 in the second area 12. A fourth light emitting element 1004 may be provided on the fourth push button 104, a fifth light emitting element 1005 may be provided on the fifth push button 105, and a sixth light emitting element 1006 may be provided on the sixth push button 106.

The activation or deactivation indication output to the first area 11 of the display apparatus 10 may be controlled in response to whether or not the plurality of air vents around the drivers seat of the vehicle 1 are blown out.

The activation or deactivation indication output to the second area 12 of the display apparatus 10 may be controlled in response to whether or not the plurality of air vents around the passenger's seat of the vehicle 1 are blown out.

For example, the user may control the blowing discharge or stopping the blowing in the first air vent 31 through an input to the first push button 101, control the blowing discharge or stopping the blowing in the second air vent 32 through an input to the second push button 102, and control the blowing discharge or stopping the blowing in the third air vent 33 through an input to the third push button 103, but it goes without saying that the blowing discharge or stopping the blowing may be controlled by various methods. In addition, the light emitting element provided in the push button may output the activation indication or the deactivation indication of the air vent corresponding to the push button. For example, the light emitting element may be a light emitting diode, and may refer to various light emitting devices capable of generating visual light.

In the above, the configuration of the vehicle 1 for performing a control operation according to the embodiment has been described. Hereinafter, the output of the display apparatus 10 by the control operation will be described in detail.

When the controller 20 receives the user input for the blowing of the air conditioner 30, the controller 20 may control the display apparatus 10 to output at least one of the activation indication and the deactivation indication for blowing of the air conditioner 30 to the first area 11.

When at least one of the activation indication and the deactivation indication for blowing air from the air conditioner 30 is output to the first area 11, the controller 20 may control the display apparatus 10 to output the deactivation indication for the blowing of the air conditioner 30 to the second area 12. When a preset time arrives, the controller 20 may control the display apparatus 10 to change the activation indication output to the second area 12 onto the deactivation indication and output it.

In the air conditioner where a synchronization (SYNC) control of the drivers seat and the passenger's seat is performed, a wind is coming in a direction of the passenger's seat, but there is a problem that a user interface does not indicate that the wind is coming out, so that a user may misunderstand that the wind is not being discharged.

Therefore, in the air conditioner 30 where a synchronization (SYNC) control of the driver's seat and the passenger's seat is performed, when the air conditioner 30 around the passenger's seat blows in a direction of a windshield glass, it makes the activation indication on the user interface. When the preset time arrives, by changing the activation indication to the deactivation indication on the user interface, the user may intuitively control the air conditioner around 30 the passenger's seat.

Hereinafter, a display method for blowing air from the air conditioner 30 capable of the SYNC control will be described.

Figure 4A:
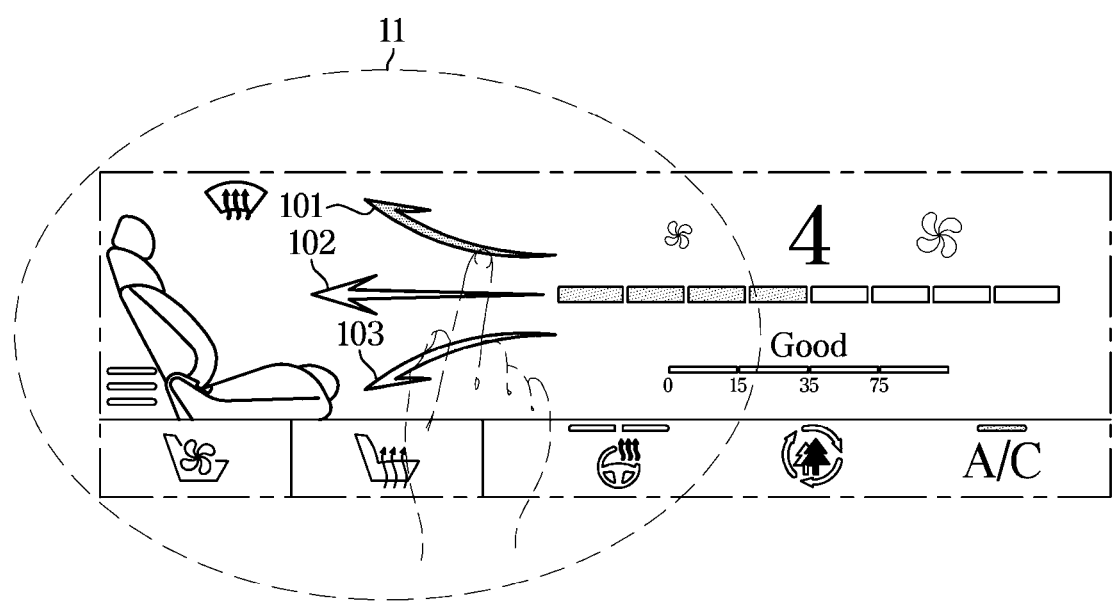
FIGS. 4A to 4C are views illustrating a display screen controlled by an air conditioner according to an embodiment of the present disclosure.
Figure 4B:
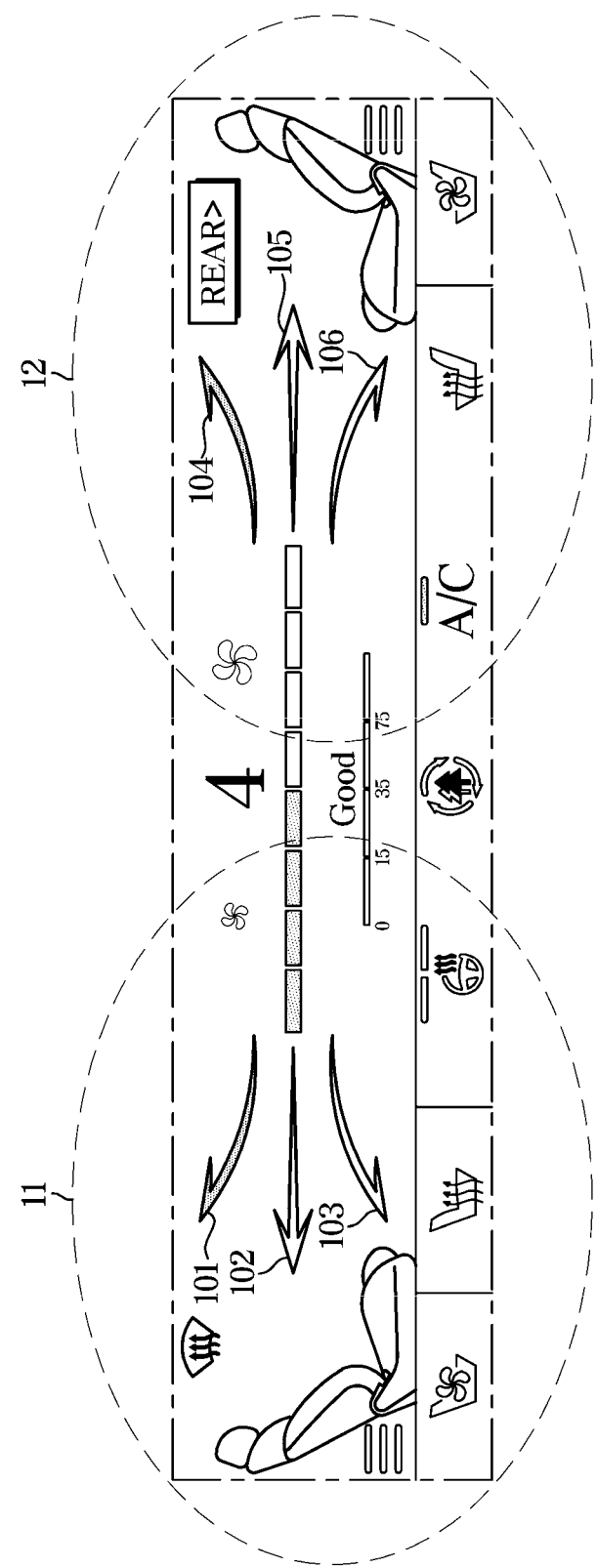
Figure 4C:
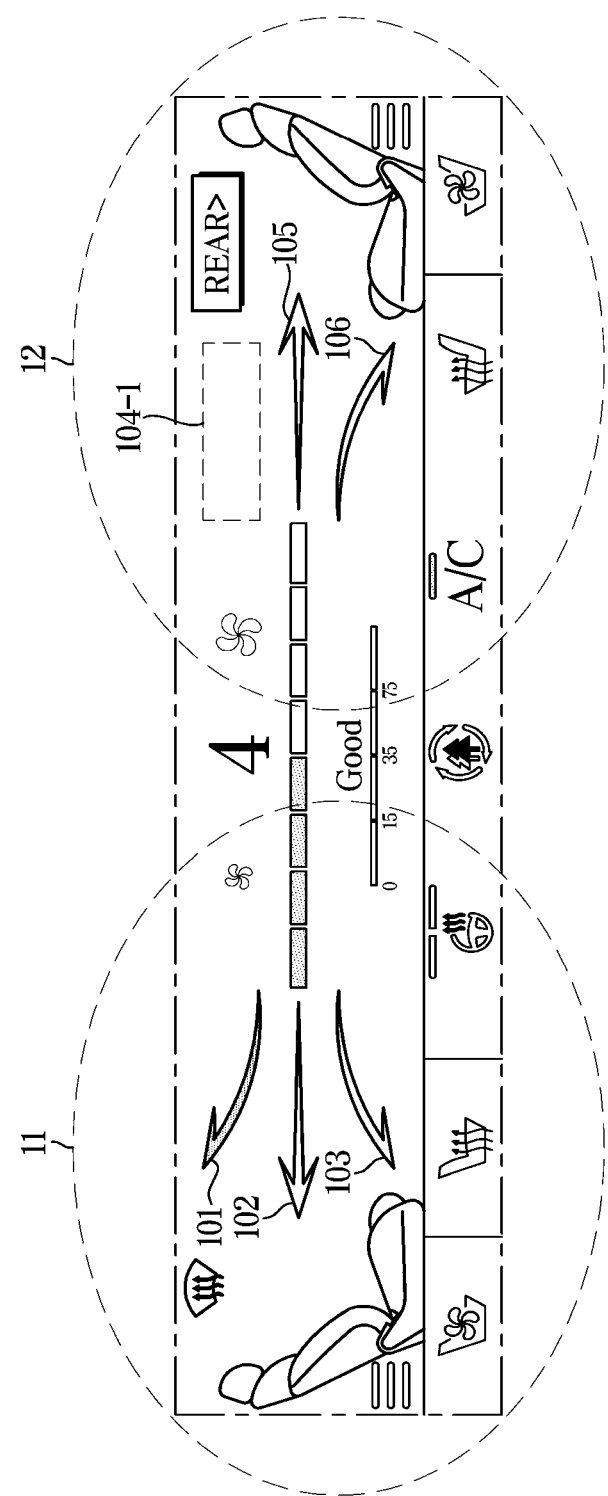

FIGS. 4A to 4C are views illustrating a display screen controlled by an air conditioner according to an embodiment of the present disclosure.

Referring to FIG. 4A, when the air conditioner 30 is not operating, and the first push button 101, the second push button 102, and the third push button 103 outputs the deactivation indication to the first area 11 and receives a user's deep mode selection input from the first area 11, the controller 20 may control the first light emitting element 1001 so that the first push button 101 of the first area 11 outputs the activation indication. The deep mode may be a mode for discharging the blowing air from the air conditioner 30 in the direction of the windshield glass.

When the user touches the first push button 101 of the first area 11, although the controller 20 is illustrated to determine that the deep mode for discharging the air blown in the direction of front windshield glass of the vehicle 1 is selected, it is not limited to touching the first push button 101 to select the deep mode.

Referring to FIG. 4B, when the first push button 101 of the first area 11 outputs the activation indication, the controller 20 may control the fourth light emitting element 1004 so that the first push button 101 and the fourth push button 104 of the second area 12 capable of the SYNC control output the activation indication.

In this case, when the user input is the control signal for discharging the air, the controller 20 may control the fourth light emitting element 1004 to output light from the entire area of the fourth push button 104 of the second area 12.

When the blowing is controlled in the blowing position corresponding to the first push button 101 of the first area 11, it goes without saying that the controller 20 may control the air conditioner 30 to control the blowing in the blowing position corresponding to the fourth push button 104 of the second area 12 capable of the SYNC based on the first push button 101.

Referring to FIG. 4C, when the preset time arrives, the controller 20 may allow the first push button 101 of the first area 11 to maintain the activation indication, and control the display apparatus 10 so that the fourth push button 104 of the second area 12 is deactivated.

Here, the deactivation of the fourth push button 104 may be a state in which the user does not recognize the fourth push button 104 by not outputting light over the entire area of the fourth light emitting element 1004 of the fourth push button 104, but the display method of deactivating the fourth push button 104 is not limited thereto.

Figure 5A:
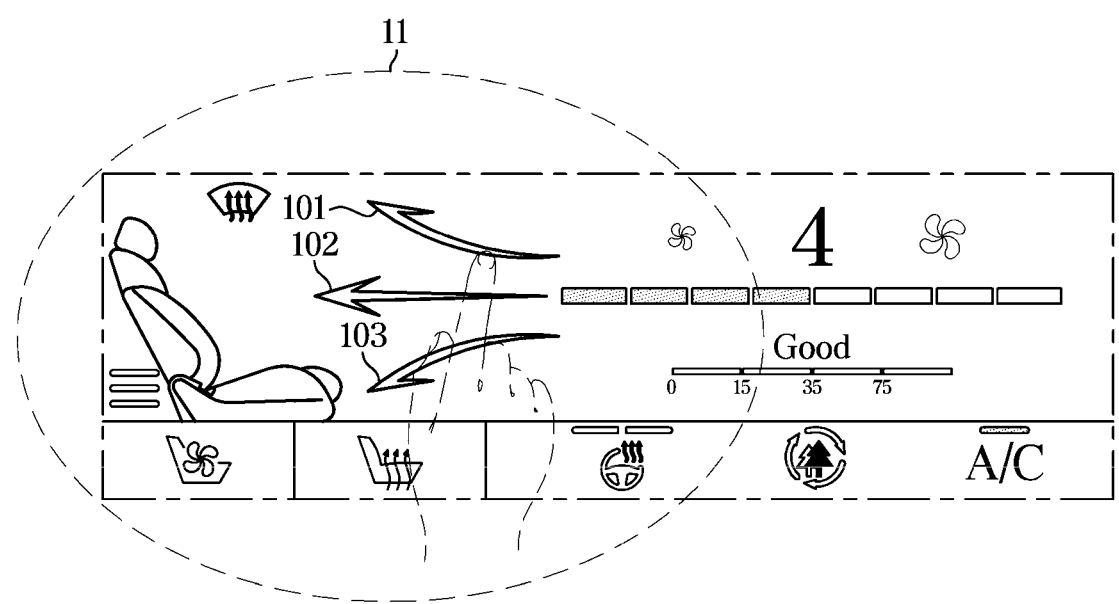
FIGS. 5A to 5C are views illustrating display screens controlled by an air conditioner according to another embodiment of the present disclosure.
Figure 5B:
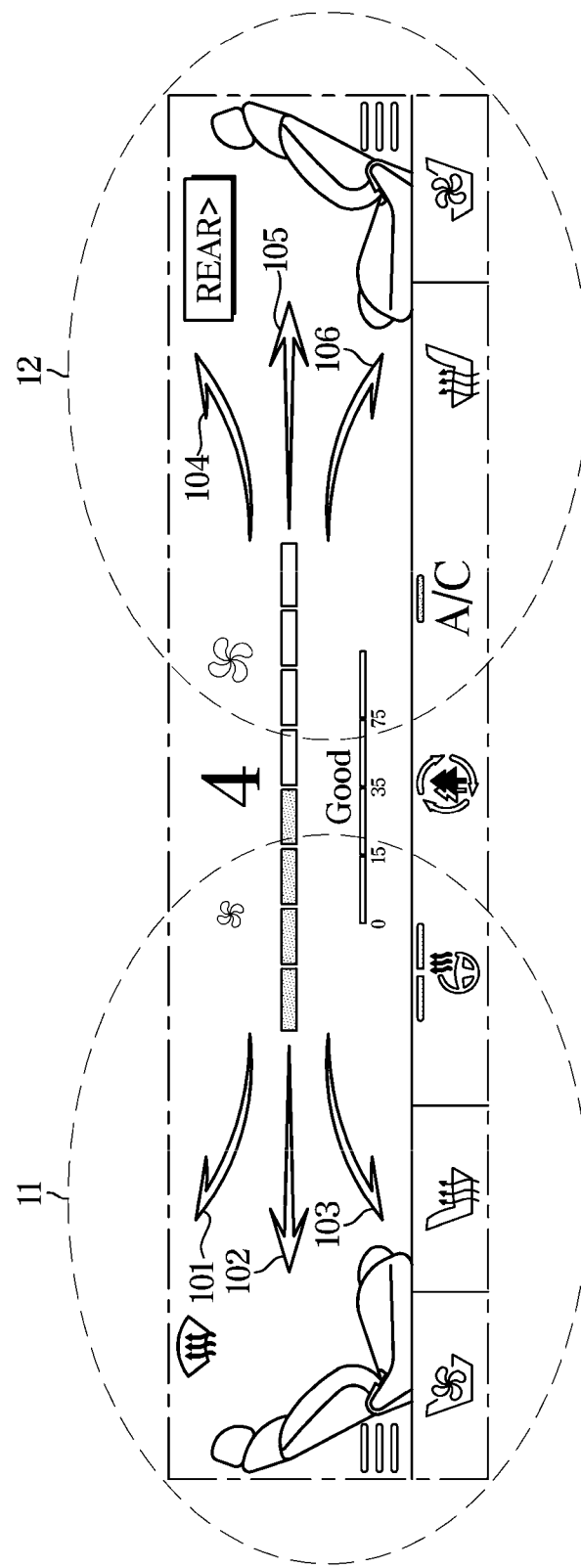
Figure 5C:
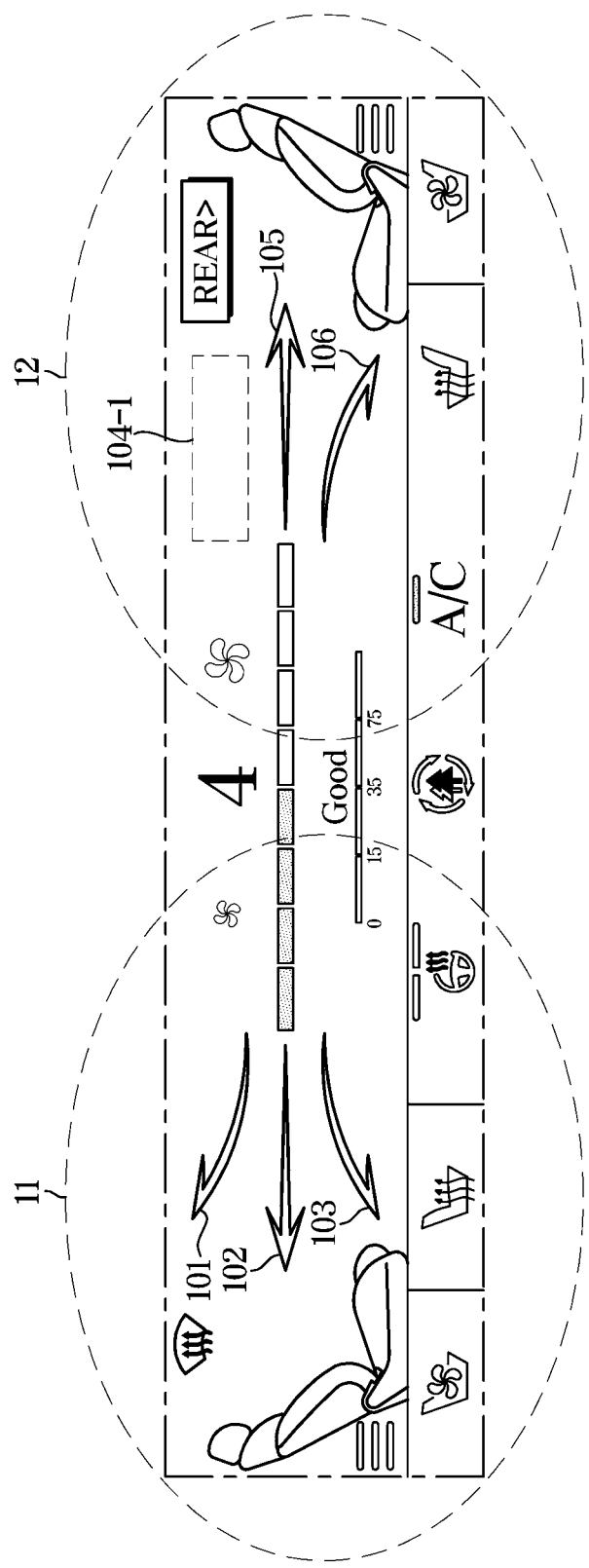

FIGS. 5A to 5C are views illustrating display screens controlled by an air conditioner according to another embodiment of the present disclosure.

Referring to FIG. 5A, while the air conditioner 30 is operating in the deep mode for discharging air in the direction of the front windshield glass and the first push button 101 of the first area 11 is outputting the activation indication, when the user input is received from the first push button 101 in the first area 11, the controller 20 may control the display apparatus 10 so that the first push button 101 outputs the deactivation indication by determining as the control signal for stopping the blowing of the air conditioner 30.

As illustrated in FIG. 5A, when the user touches the first push button 101 of the first area 11, although it is illustrated that the controller 20 determines the blowing as the control signal for stopping blowing air in the deep mode, it is not limited to touching the first push button 101.

Referring to FIG. 5B, the controller 20 may control the display apparatus 10 to output the deactivation indication to the first push button 101 of the first area 11 and to output the activation indication to the fourth push button 104 of the second area 12 at the same time.

At this time, when the user input is the control signal for stopping blowing air, as illustrated in FIG. 5B, the fourth emitting element 1004 may be controlled so that light is not output from the entire fourth push button 104 but only the outside.

Referring to FIG. 5C, when the preset time arrives, the controller 20 may control the display apparatus 10 so that the fourth push button 104 of the second area 12 is deactivated 104-1.

Here, when the fourth push button 104 is deactivated, the controller 20 may be in a state in which the user does not recognize the fourth push button 104 by not outputting light from the entire area of the fourth light emitting element 1004, but the display method of deactivating the fourth push button 104 is not limited thereto.

Figure 6A:
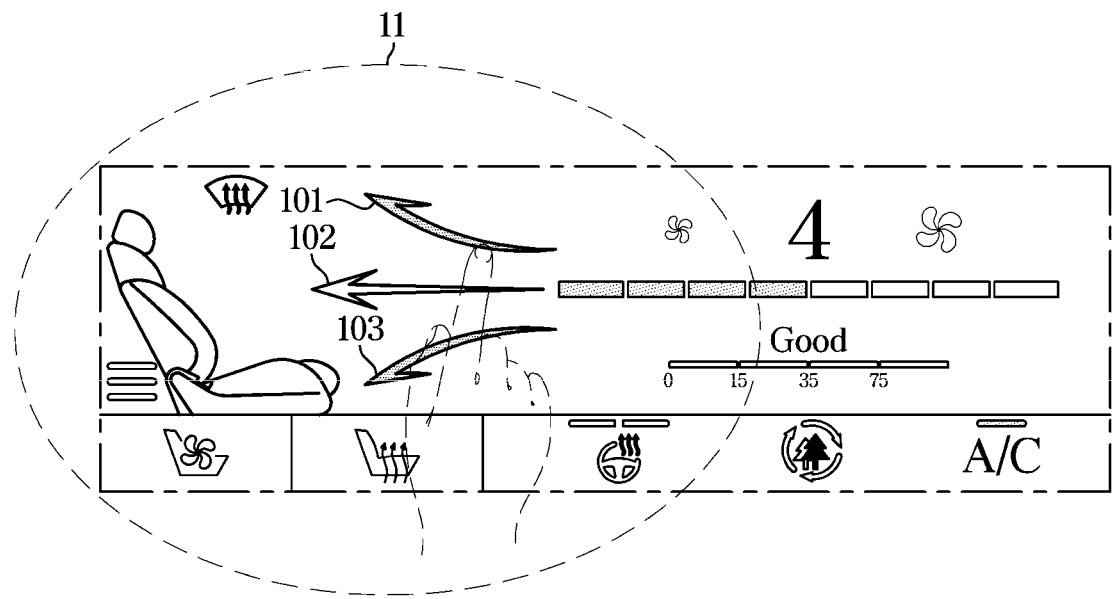
FIGS. 6A to 6C are views illustrating display screens controlled by an air conditioner according to another embodiment of the present disclosure.
Figure 6B:
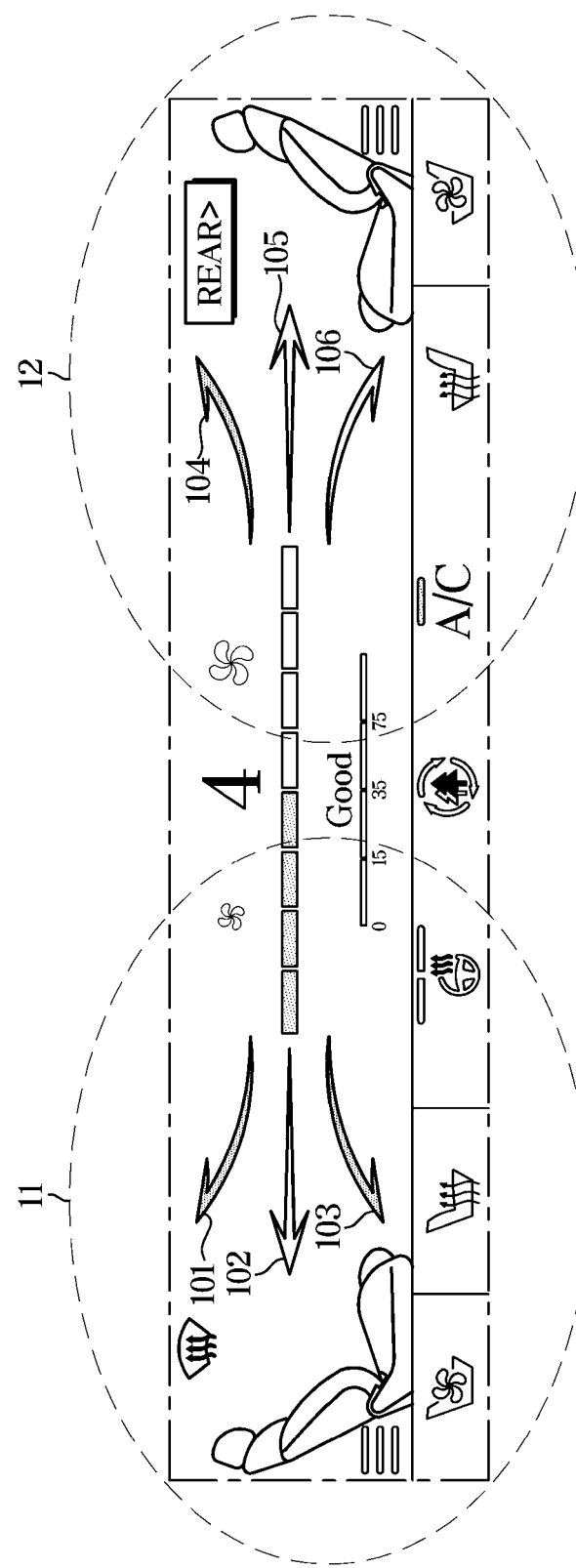
Figure 6C:
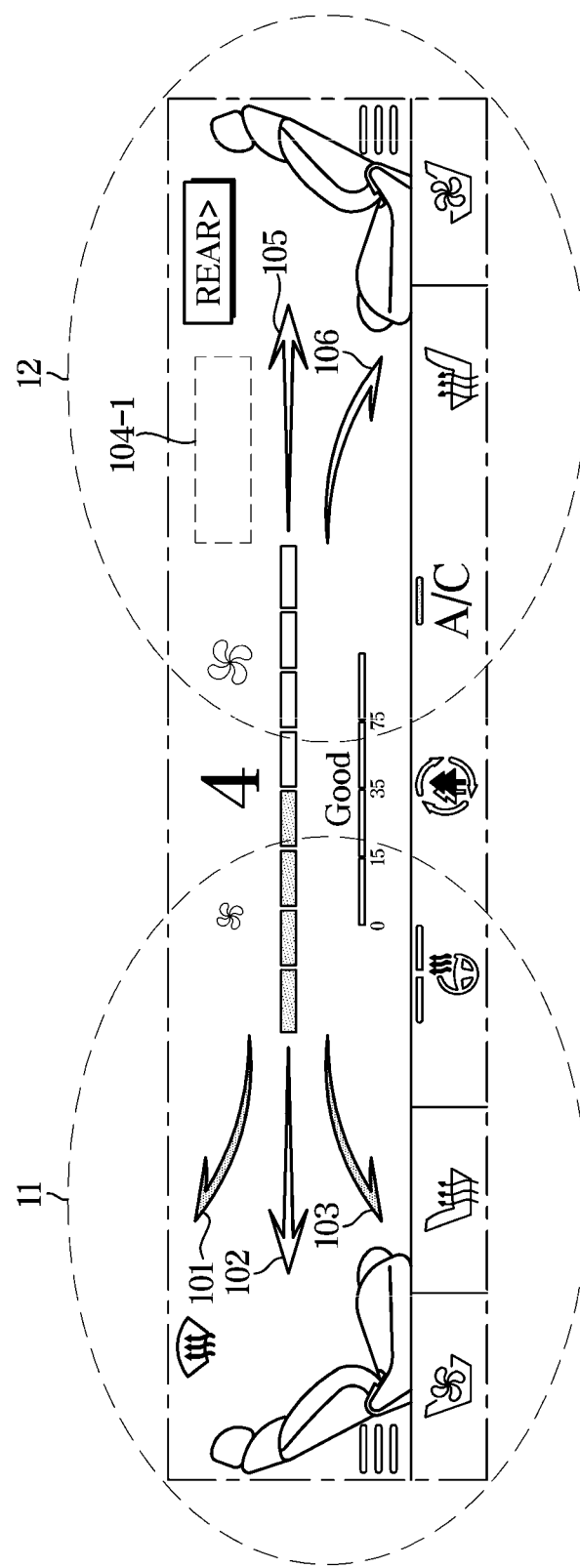

FIGS. 6A to 6C are views illustrating display screens controlled by an air conditioner according to another embodiment of the present disclosure.

Referring to FIG. 6A, when the air conditioner 30 is not operating, and the first push button 101, the second push button 102, and the third push button 103 outputs the deactivation indication to the first area 11 and receives a user's mixed mode selection input from the first area 11, the controller 20 may control the first light emitting element 1001 and the third light emitting element 1003 so that the first push button 101 and the third push button 103 of the first area 11 outputs the activation indication. The mixed mode may be a mode for discharging the blowing air from the air conditioner 30 in the direction of the windshield glass and at the same time discharging the blowing air in a direction below the driver's seat.

When the user touches the first push button 101 of the first area 11, although the controller 20 is illustrated to determine that the mixed mode for discharging the blowing air in the direction of front windshield glass of the vehicle 1 and discharging the blowing air in the direction below the driver's seat is selected, it is not limited to touching the first push button 101.

Referring to FIG. 6B, when the first push button 101 of the first area 11 outputs the activation indication, the controller 20 may control the fourth light emitting element 1004 so that the first push button 101 and the fourth push button 104 of the second area 12 capable of the SYNC control output the activation indication.

In this case, when the user input is the control signal for discharging the air, the controller 20 may control the fourth light emitting element 1004 to output light from the entire area of the fourth push button 104 of the second area 12.

When the blowing is controlled in the blowing position corresponding to the first push button 101 of the first area 11, it goes without saying that the controller 20 may control the blowing in the blowing position corresponding to the fourth push button 104 of the second area 12 capable of the SYNC based on the first push button 101.

Referring to FIG. 6C, when the preset time arrives, the controller 20 may allow the first push button 101 and the third push button 103 of the first area 11 to maintain the activation indication, and control the display apparatus 10 so that the fourth push button 104 of the second area 12 is deactivated 104-1.

Here, the deactivation of the fourth push button 104 may be a state in which the user does not recognize the fourth push button 104 by not outputting light over the entire area of the fourth light emitting element 1004 of the fourth push button 104, but the display method of deactivating the fourth push button 104 is not limited thereto.

Figure 7A:
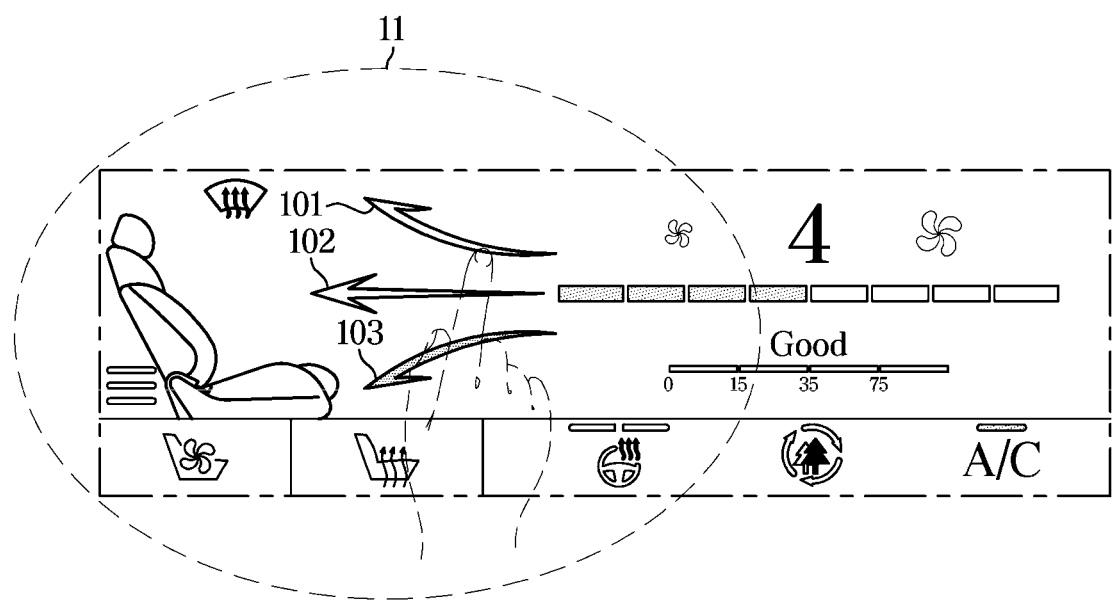
FIGS. 7A to 7C are views illustrating display screens controlled by an air conditioner according to another embodiment of the present disclosure.
Figure 7B:
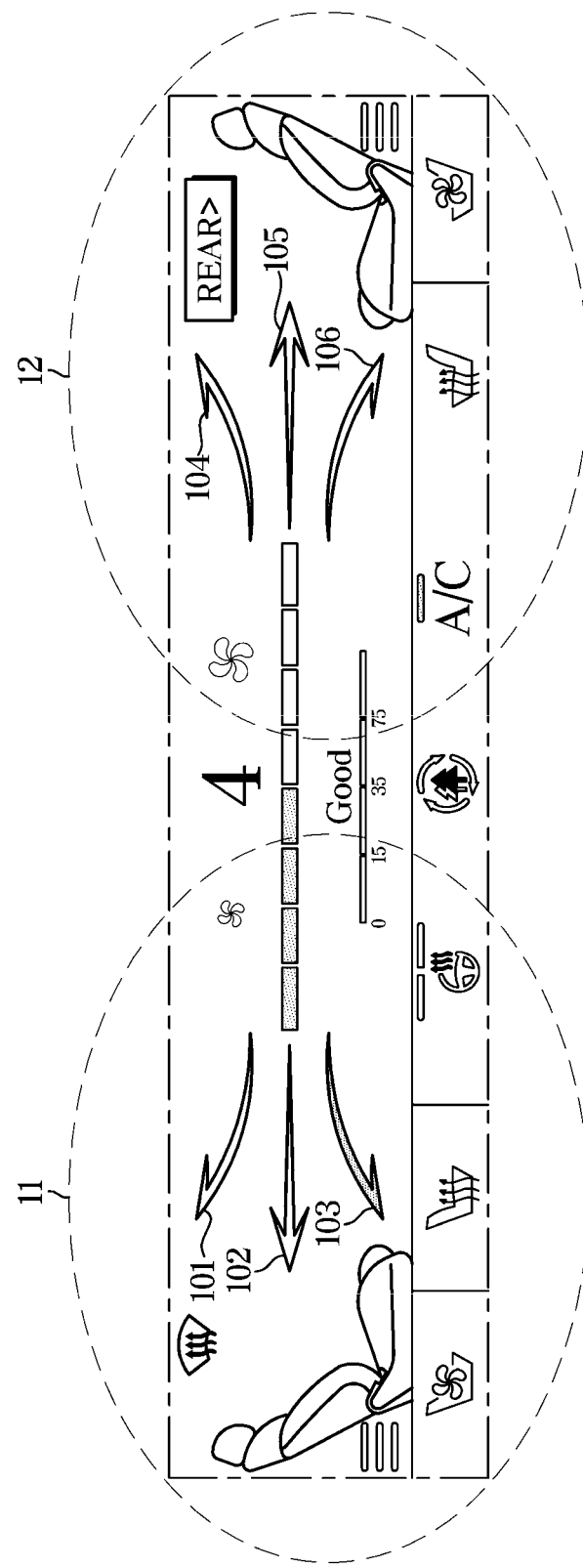
Figure 7C:
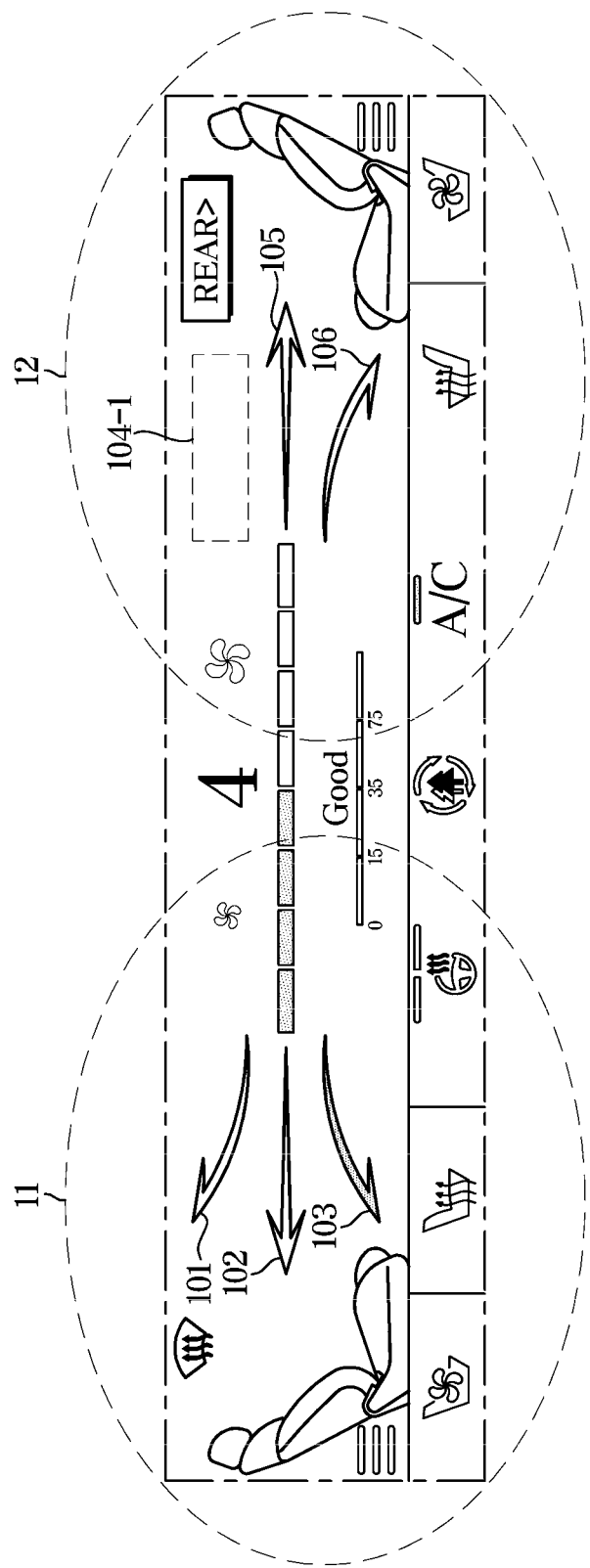

FIGS. 7A to 7C are views illustrating display screens controlled by an air conditioner according to another embodiment of the present disclosure.

Referring to FIG. 7A, while the air conditioner 30 is operating in the mixing mode for discharging the blowing air in the direction of the front windshield glass and discharging the blowing air in the direction below the driver's seat and the first push button 101 and the third push button 103 of the first area 11 is outputting the activation indication, when the user input is received from the first push button 101 in the first area 11, the controller 20 may control the first light emitting element 1001 so that the first push button 101 of the first area 11 outputs the deactivation indication by determining as the control signal for stopping the blowing air in the direction of the front windshield glass of the air conditioner 30.

At this time, the controller 20 may control the air conditioner 30 to maintain the blowing air discharge in the direction below the driver's seat, and the third push button 103 of the first area 11 may control to maintain the activation indication output.

When the user touches the first push button 101 of the first area 11, although the controller 20 is illustrated to determine as the control signal for stopping the blowing air in the direction of the front windshield glass of the air conditioner 30 of the vehicle 1, it is not limited to touching the first push button 101.

Referring to FIG. 7B, the controller 20 may maintain the activation indication output of the third push button 103 of the first area 11, and may control the display apparatus 10 to output the deactivation indication to the first push button 101 of the first area 11 and to output the activation indication to the fourth push button 104 of the second area 12 at the same time.

When the user input is the control signal for stopping the blowing air, as illustrated in FIG. 7B, the light emitting element 1004 may be controlled so that light is not output from the entire fourth push button 104, but only the outside.

Referring to FIG. 5C, when the preset time arrives, the controller 20 may control the display apparatus 10 so that the fourth push button 104 of the second area 12 is deactivated 104-1.

Here, when the fourth push button 104 is deactivated, the controller 20 may be in a state in which the user does not recognize the fourth push button 104 by not outputting light from the entire area of the fourth light emitting element 1004, but the display method of deactivating the fourth push button 104 is not limited thereto.

Although not illustrated, when the user touches the second push button 102 of the first area 11, the controller 20 may control the second light emitting element 1002 so that the second push button 102 is activated by determining that a mode for discharging the blowing air in the center of the drivers seat of the vehicle 1 is selected.

While the second push button 102 is outputting the activation indication, when the user input is received at the second push button 102, the controller 20 may control the second light emitting element 1002 so that the second push button 102 is deactivated by determining as a signal for stopping the blowing air in the center of the driver's seat of the vehicle 1.

When the user touches the fifth push button 105 of the second area 12, the controller 20 may control the fifth light emitting element 1005 so that the fifth push button 105 is activated by determining that a mode for discharging the blowing air in the center of the passenger's seat of the vehicle 1 is selected.

While the fifth push button 105 is outputting the activation indication, when the user input is received at the fifth push button 105, the controller 20 may control the fifth light emitting element 1005 so that the fifth push button 105 is deactivated by determining as the signal for stopping the blowing air in the center of the passengers seat of the vehicle 1.

As described above, the second push button 102, the third push button 103, the fifth push button 105 and the sixth push button 106 corresponding to the blowing position of the air conditioner 30 not performing the SYNC control may output the activation indication and the deactivation indication, respectively, corresponding to the user input.

It goes without saying that the embodiments of the present disclosure may be equally applied to various modes of the air conditioner 30 such as the deep mode, the mixed mode, and a vented deep mode.

FIG. 8 is a flowchart illustrating a method of controlling a vehicle according to an embodiment. However, this is only a preferred embodiment for achieving the object of the present disclosure, and of course, some steps may be added or deleted as necessary.

The controller 20 may receive the control signal for changing the air conditioning mode of the air conditioner 30 (110).

The controller 20 may determine whether the deep mode for discharging the blowing air in the direction of the windshield glass is selected (120).

When it is determined that the deep mode is selected, the controller 20 may control the display apparatus 10 so that the first push button 101 of the first area 11 of the display apparatus 10 outputs the activation indication, and may control the display apparatus 10 so that the fourth push button 104 of the second area 12 outputs the activation indication (140).

Here, the second area 12 may be a partial area of the display apparatus 10 corresponding to the passenger's seat.

When the user input is not received before the preset time arrives while the first push button 101 of the first area 11 and the fourth push button 104 of the second area 12 output the activation indication, the controller 20 may control the display apparatus 10 so that the first push button 101 becomes the deactivation indication in the second area 12 of the display apparatus 10 (150). At this time, when the user input is received before the preset time arrives the controller 20 may control the display apparatus 10 so that the plurality of push buttons of the first area 11 and the second area 12 output the activation indication or the deactivation indication based on the user input.

When it is not determined that the deep mode is selected, when the controller 20 receives the user input to the plurality of push buttons of the first area 11 and the second area 12, the controller 20 may repeatedly output the activation or deactivation indication of the plurality of push buttons corresponding to the user input (130).

For example, when the user input is received at the fifth push button 105 of the second area 12, the controller 20 may control the display apparatus 10 so that the fifth push button 105 outputs the activation indication. When the user input is received again at the fifth push button 105 while the fifth push button 105 outputs the activation indication, the controller 20 may control the display apparatus 10 so that the fifth push button 105 outputs the deactivation indication.

Figure 9:
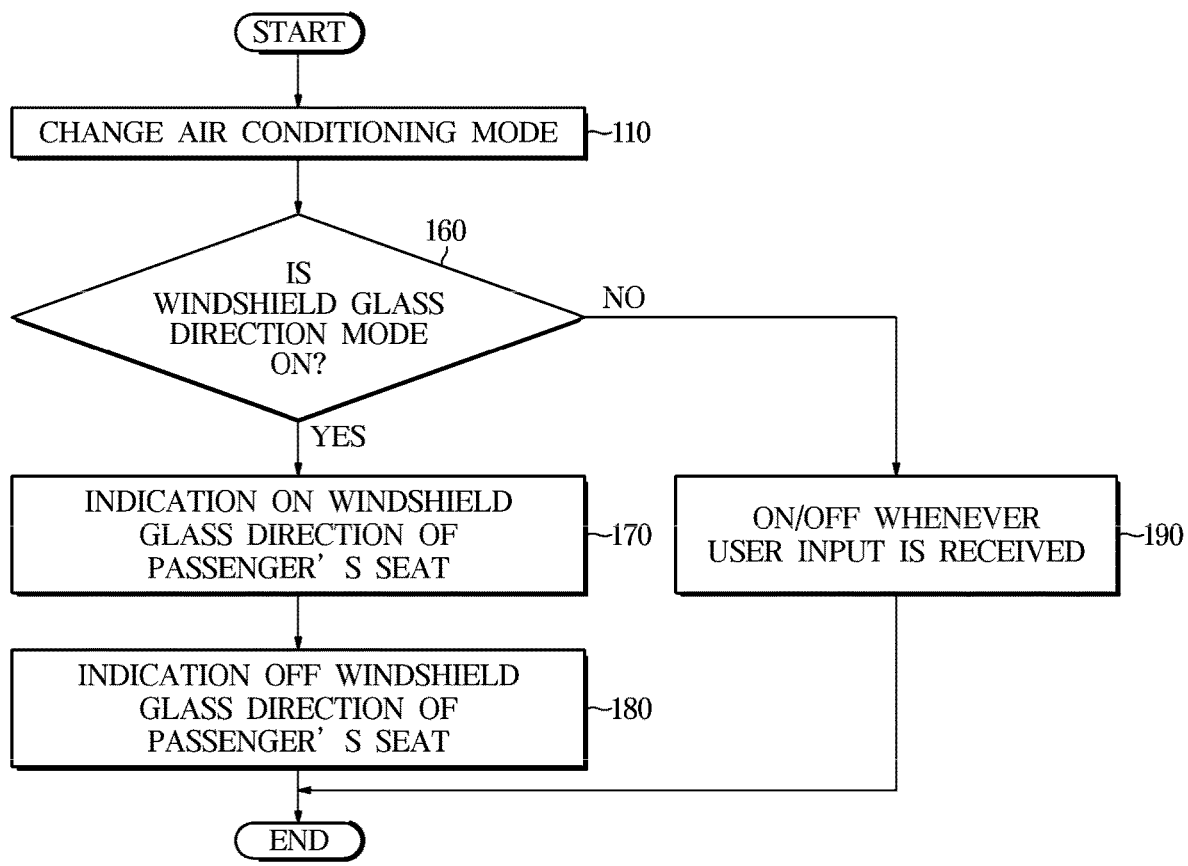
FIG. 9 is a flowchart illustrating a method of controlling a vehicle according to another embodiment.

FIG. 9 is a flowchart illustrating a method of controlling a vehicle according to another embodiment of the present disclosure. However, this is only the preferred embodiment for achieving the object of the present disclosure, and of course, some steps may be added or deleted as necessary.

The controller 20 may receive the control signal for changing the air conditioning mode of the air conditioner 30 (110).

The controller 20 may determine whether the deep mode off for stopping the blowing air in the direction of the windshield glass is selected (160).

When it is determined that the deep mode off is selected, the controller 20 may control the display apparatus 10 so that the first push button 101 of the first area 11 of the display apparatus 10 outputs the deactivation indication, and may control the display apparatus 10 so that the fourth push button 104 of the second area 12 outputs the activation indication (140).

Here, the second area 12 may be a partial area of the display apparatus 10 corresponding to the passenger's seat.

When the preset time arrives, the controller 20 may control the display apparatus 10 so that the fourth push button 104 becomes the deactivation indication in the second area 12 of the display apparatus 10 (180).

When it is not determined that the deep mode off is selected, when the controller 20 receives the user input to the plurality of push buttons of the first area 11 and the second area 12, the controller 20 may repeatedly output the activation or deactivation indication of the plurality of push buttons corresponding to the user input (130).

For example, when the user input is received at the fifth push button 105 of the second area 12, the controller 20 may control the display apparatus 10 so that the fifth push button 105 outputs the activation indication. When the user input is received again at the fifth push button 105 while the fifth push button 105 outputs the activation indication, the controller 20 may control the display apparatus 10 so that the fifth push button 105 outputs the deactivation indication.

According to the embodiments of the present disclosure, in the air conditioner in which the SYNC control of the driver's seat and the passengers seat is performed, when the blowing is discharged in the direction of the passengers seat, the activation indication is displayed on the user interface, and when the preset time arrives, the activation indication on the user interface is changed to the deactivated display, so that the user may intuitively control the air conditioner around the passengers seat.

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, and the like.

Embodiments of the present disclosure have thus far been described with reference to the accompanying drawings. It should be apparent to those of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. A vehicle comprising:
    an air conditioner;
    a display apparatus configured to receive a user input for blowing discharge of the air conditioner capable of synchronization (SYNC) control, and including a first area and a second area configured to output at least one of an activation indication and a deactivation indication for blowing discharge of the air conditioner; and
    a controller configured to:
        in response to the user input for blowing discharge of the air conditioner capable of SYNC control being received, output at least one of the activation indication and the deactivation indication for blowing discharge of the air conditioner in the first area,
        in response to a time point at which at least one of the activation indication and the deactivation indication for blowing discharge of the air conditioner is output in the first area, output the activation indication for blowing discharge of the air conditioner in the second area, and
        control the display apparatus to change and output the activation indication to the deactivation indication in the second area in response to the arrival of a preset time,
    wherein the first area comprises a plurality of push buttons, and the plurality of push buttons are configured to correspond to a blowing position of the air conditioner, respectively; and
    the second area comprises a plurality of push buttons, and the plurality of push buttons are configured to correspond to the blowing position of the air conditioner, respectively,
    wherein the first area comprises a first push button, a second push button, and a third push button; and
    the second area comprises a fourth push button, a fifth push button, and a sixth push button, and
    wherein the controller is configured to
        in response to receiving the user input for discharging blowing air in the direction of the windshield glass of the vehicle while the first push button of the first area outputs the deactivation indication, output the activation indication to the first push button of the first area and the fourth push button of the second area; and
        in response to the arrival of the preset time, control the display apparatus so that the first push button of the first area maintains the activation indication, and the fourth push button of the second area changes the activation indication to the deactivation indication and outputs the deactivation indication.

2. The vehicle according to claim 1, wherein a blowing direction according to the blowing position of the air conditioner corresponding to the first push button of the first area and the fourth push button of the second area is a direction of a windshield glass of the vehicle.

3. The vehicle according to claim 1, wherein the blowing discharge according to the blowing position of the air conditioner corresponding to the first push button of the first area and the fourth push button of the second area is configured to enable mutual SYNC control.

4. The vehicle according to claim 1, wherein the controller is configured to:
    in response to receiving the user input for stopping blowing air in the direction of the windshield glass of the vehicle while the first push button of the first area outputs the activation indication, output the deactivation indication to the first push button of the first area and output the activation indication to the fourth push button of the second area; and
    in response to the arrival of the preset time, control the display apparatus so that the fourth push button of the second area changes the activation indication to the deactivation indication and outputs the deactivation indication.

5. The vehicle according to claim 1, wherein, in response to receiving the user input from the first push button of the first area while the first push button of the first area outputs the deactivation indication, the controller is configured to control the air conditioner so that the air conditioner discharges blowing air in the blowing position of the vehicle corresponding to positions of the first push button of the first area and the fourth push button of the second area.

6. The vehicle according to claim 1, wherein the controller is configured to:
  in response to receiving the user input for discharging blowing air in the direction of the windshield glass of the vehicle and in a direction below a driver's seat while the first push button of the first area outputs the deactivation indication, output the activation indication to the first push button of the first area, the third push button of the first area, and the fourth push button of the second area; and
  in response to the arrival of the preset time, control the display apparatus so that the first push button of the first area and the third push button of the first area maintain the activation indication, and the fourth push button of the second area changes the activation indication to the deactivation indication and output the deactivation indication.

7. The vehicle according to claim 1, wherein, in response to receiving the user input for blowing discharge of the air conditioner in at least one of a direction of a driver's seat, a direction below the driver's seat, a direction of a passenger's seat, and a direction below the passenger's seat of the vehicle, the controller is configured to control the display apparatus to output at least one of the activation indication and the deactivation indication to at least one of the second push button of the first area, the third push button of the first area, the fifth push button of the second area, and the sixth push button of the second area corresponding to the blowing position.

8. A method of controlling a vehicle comprising:
  in response to a user input for blowing discharge of an air conditioner capable of synchronization (SYNC) control being received, outputting, by a controller, at least one of an activation indication and a deactivation indication for blowing discharge of the air conditioner in a first area of a display apparatus;
  in response to a time point at which at least one of the activation indication and the deactivation indication for blowing discharge of the air conditioner is output in the first area, outputting, by the controller, the activation indication for blowing discharge of the air conditioner in a second area of the display apparatus; and
  changing and outputting, by the controller, the activation indication to the deactivation indication in the second area in response to the arrival of a preset time,
  wherein the first area comprises a plurality of push buttons, and the plurality of push buttons are configured to correspond to a blowing position of the air conditioner, respectively; and
  the second area comprises a plurality of push buttons, and the plurality of push buttons are configured to correspond to the blowing position of the air conditioner, respectively,
  wherein the first area comprises a first push button, a second push button, and a third push button; and the second area comprises a fourth push button, a fifth push button, and a sixth push button,
  further comprising in response to receiving the user input for discharging blowing air in the direction of the windshield glass of the vehicle while the first push button of the first area outputs the deactivation indication, outputting, by the controller, the activation indication to the first push button of the first area and the fourth push button of the second area; and
  in response to the arrival of the preset time, controlling, by the controller, the display apparatus so that the first push button of the first area maintains the activation indication, and the fourth push button of the second area changes the activation indication to the deactivation indication and outputs the deactivation indication.

9. The method according to claim 8, wherein a blowing direction according to the blowing position of the air conditioner corresponding to the first push button of the first area and the fourth push button of the second area is a direction of a windshield glass of the vehicle.

10. The method according to claim 8, wherein the blowing discharge according to the blowing position of the air conditioner corresponding to the first push button of the first area and the fourth push button of the second area is configured to enable mutual SYNC control.

11. The method according to claim 8, further comprising:
  in response to receiving the user input for stopping blowing air in the direction of the windshield glass of the vehicle while the first push button of the first area outputs the activation indication, outputting, by the controller, the deactivation indication to the first push button of the first area and output the activation indication to the fourth push button of the second area; and
  in response to the arrival of the preset time, controlling, by the controller, the display apparatus so that the fourth push button of the second area changes the activation indication to the deactivation indication and outputs the deactivation indication.

12. The method according to claim 8, further comprising:
  in response to receiving the user input from the first push button of the first area while the first push button of the first area outputs the deactivation indication, controlling, by the controller, the air conditioner so that the air conditioner discharges blowing air in the blowing position of the vehicle corresponding to positions of the first push button of the first area and the fourth push button of the second area.

13. The method according to claim 8, further comprising:
  in response to receiving the user input for discharging blowing air in the direction of the windshield glass of the vehicle and in a direction below a driver's seat while the first push button of the first area outputs the deactivation indication, outputting, by the controller, the activation indication to the first push button of the first area, the third push button of the first area, and the fourth push button of the second area; and
  in response to the arrival of the preset time, controlling, by the controller, the display apparatus so that the first push button of the first area and the third push button of the first area maintain the activation indication, and the fourth push button of the second area changes the activation indication to the deactivation indication and output the deactivation indication.

14. The vehicle according to claim 8, further comprising:
  in response to receiving the user input for blowing discharge of the air conditioner in at least one of a direction of a driver's seat, a direction below the driver's seat, a direction of a passenger's seat, and a direction below the passenger's seat of the vehicle, controlling, by the controller, the display apparatus to output at least one of the activation indication and the deactivation indication to at least one of the second push button of the first area, the third push button of the first area, the fifth push button of the second area, and the sixth push button of the second area corresponding to the blowing position.

\* \* \* \* \*